United States Patent [19]

Wilson

[11] 4,339,029
[45] Jul. 13, 1982

[54] SHAKER CONVEYOR AND DRIVE MECHANISM THEREFOR

[76] Inventor: Dennis A. Wilson, 1805 S. Darrell Rd., McHenry, Ill. 60050

[21] Appl. No.: 232,686

[22] Filed: Feb. 9, 1981

[51] Int. Cl.³ .............................................. B65G 25/04
[52] U.S. Cl. ....................................... 198/750; 74/26; 74/55; 198/766; 198/765
[58] Field of Search ...................... 74/26, 55; 198/750, 198/763, 766, 765

[56] References Cited

U.S. PATENT DOCUMENTS

| | | | |
|---|---|---|---|
| 1,089,633 | 3/1914 | Franz | 74/26 |
| 2,445,613 | 7/1948 | Fincher | 74/26 |
| 2,700,472 | 1/1955 | Carrier, Jr. et al. | |
| 2,991,872 | 7/1961 | Keegan. | |
| 3,012,654 | 12/1961 | Allen et al. | |
| 3,038,589 | 6/1962 | Allen et al. | |
| 3,099,349 | 7/1963 | Sinden. | |
| 3,107,549 | 10/1963 | Matthews | 74/26 X |
| 3,240,322 | 3/1966 | Allen. | |
| 3,605,996 | 9/1971 | Holman. | |
| 4,019,626 | 4/1977 | Kamner | 198/766 X |

FOREIGN PATENT DOCUMENTS 283880 8/1928 United Kingdom .................... 74/26

Primary Examiner—Jeffrey V. Nase
Attorney, Agent, or Firm—Mathew R. P. Perrone, Jr.

[57] ABSTRACT

A shaker conveyor is operated by a drive mechanism using rotary motion converted to reciprocating motion by an eccentric, which provides for a shaker conveyor driven by a compact drive system.

31 Claims, 12 Drawing Figures

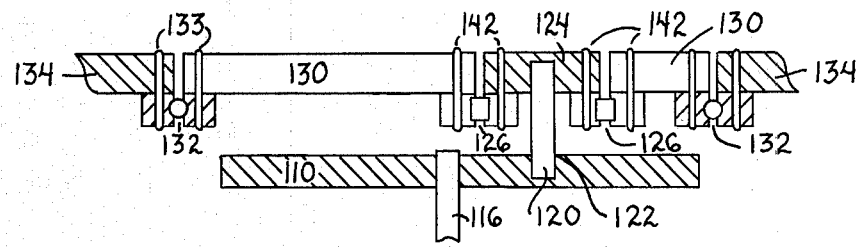
Fig. II
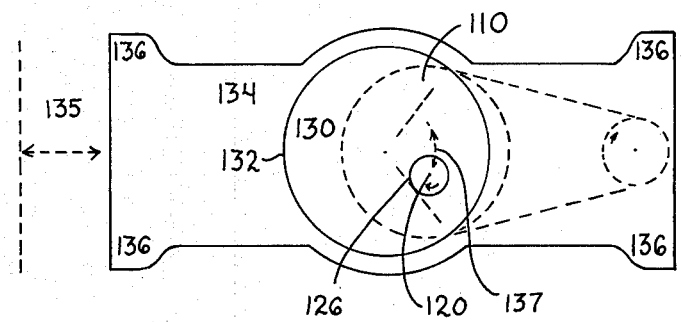
Fig. III
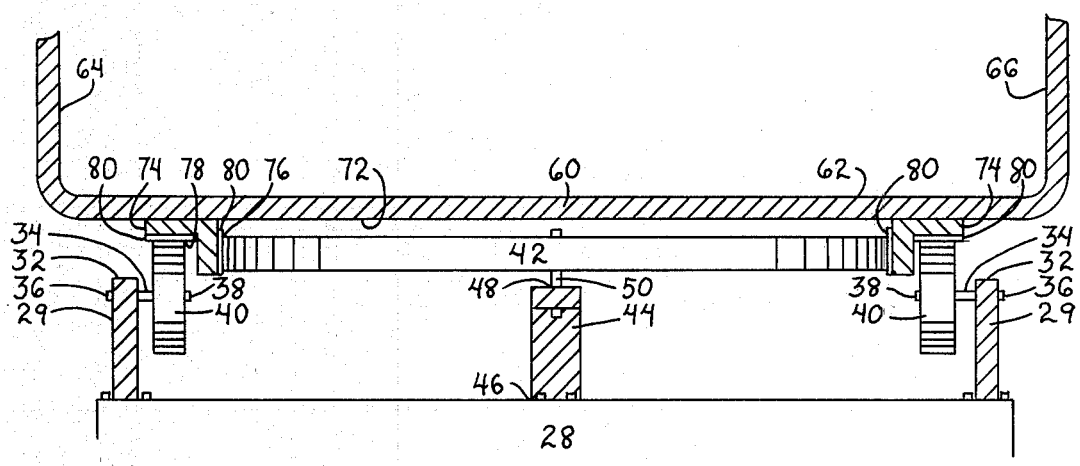
Fig. IV

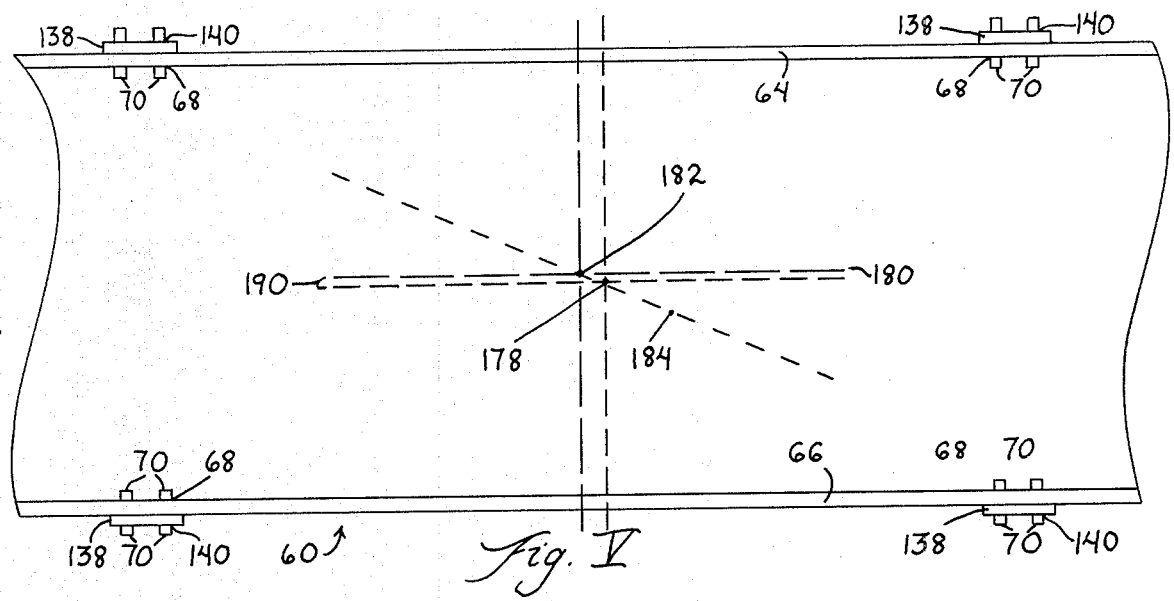
Fig. V
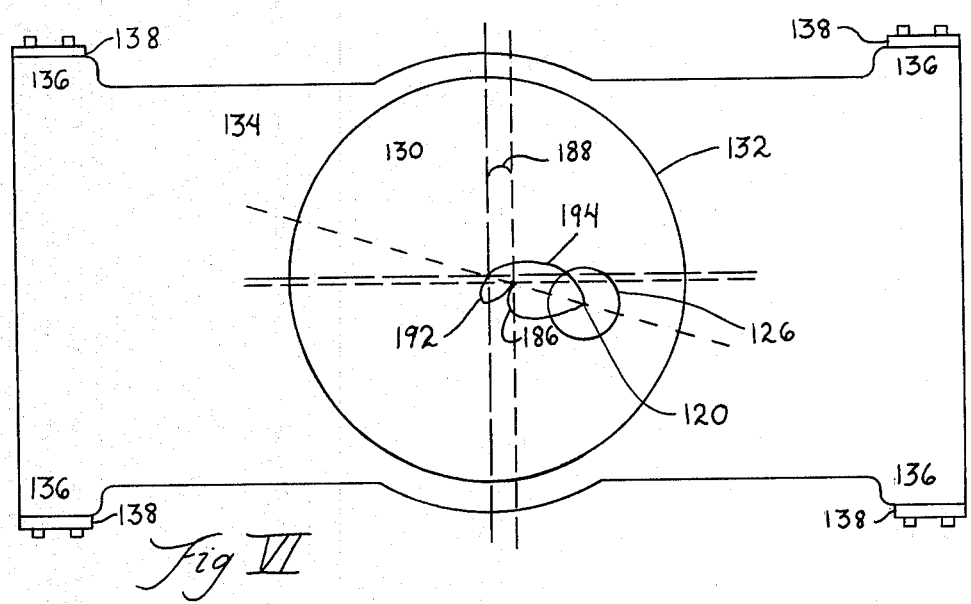
Fig. VI
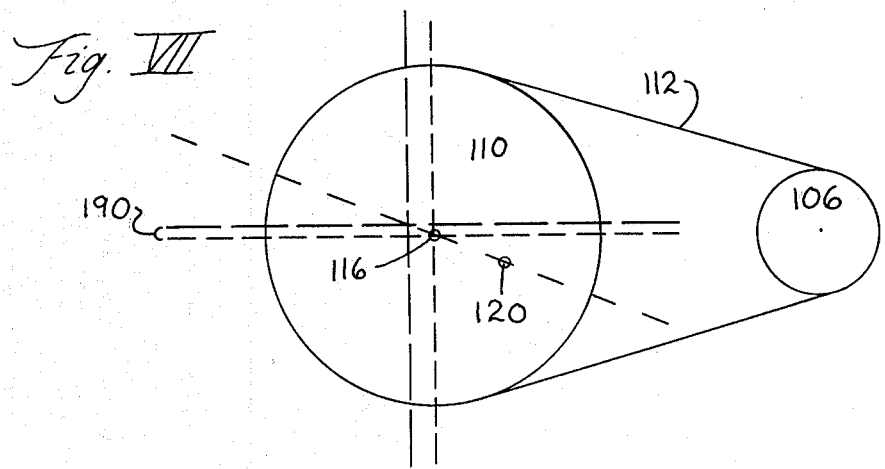
Fig. VII

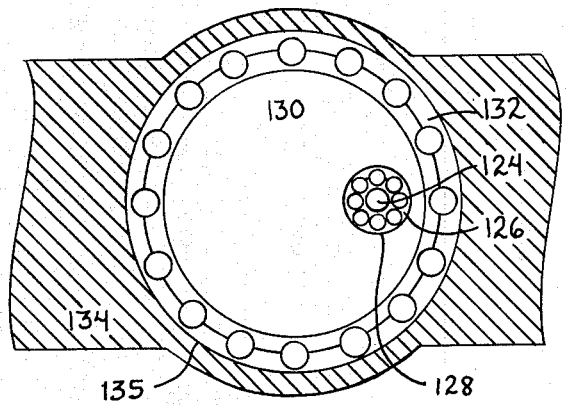
Fig. VIII
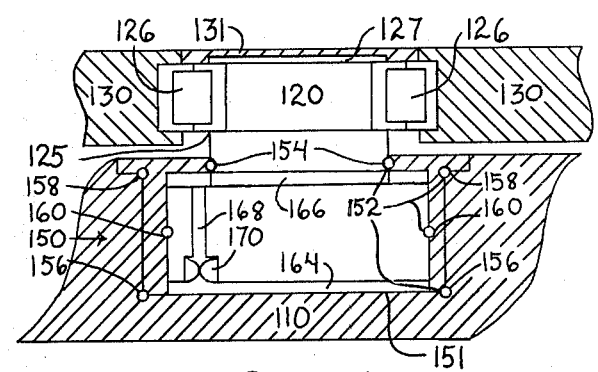
Fig. IX
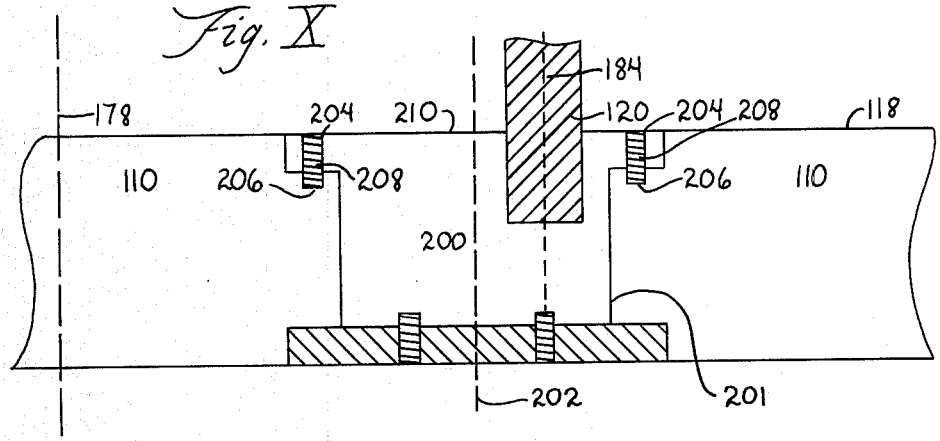
Fig. X
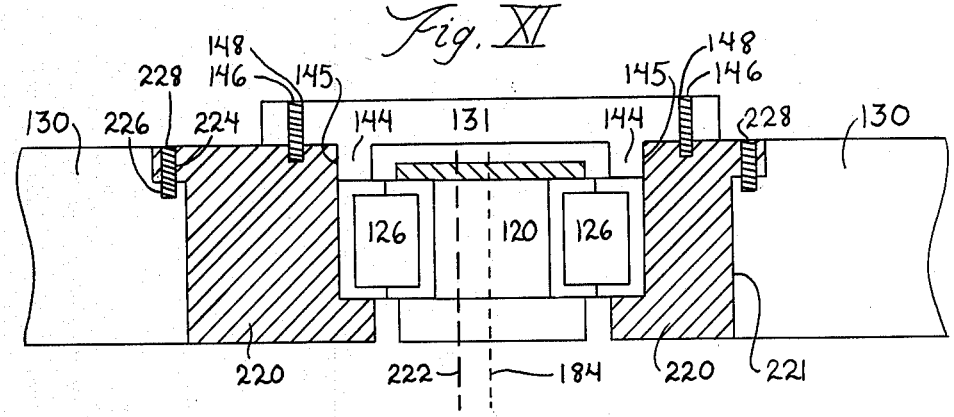
Fig. XI

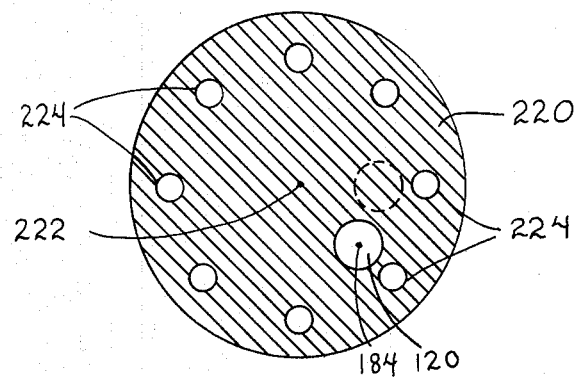
Fig. XII

SHAKER CONVEYOR AND DRIVE MECHANISM THEREFOR

BACKGROUND OF THE INVENTION

This invention relates to a shaker conveyor and more particularly to a shaker conveyor and improved rotary drive mechanism therefor.

Conveyors are used in manufacturing and other appropriate industries as an efficient way of moving material of many different types from one place to another. A shaker conveyor is especially useful because it can transport a wide variety of materials. A shaker conveyor may even be used to transfer corrosive, high-temperature, heavy, or other difficult to transport materials from place to place. For example, hot metal castings can be transported by shaker conveyor as can particulate material or other material difficult to transport due to physical or chemical characteristics. The flexibility as to different types of materials is derived from the trough which supports the material being carried. This trough can be made of solid material resistant to heat, corrosion, or physical or chemical problems caused by the material being transported.

The trough in a shaker conveyor is moved in a longitudinal reciprocating movement in order to move the material carried thereby in a desired direction. Conventionally, the trough on a shaker conveyor is accelerated in the direction of a desired material movement in order to reach the maximum velocity and then decelerated rapidly followed by a reversal of direction so that the material thereon slides an incremental distance in the desired direction. As the trough is moving in a direction opposite to the desired direction of material movement, the material decelerates and comes to rest, and immediately begins to accelerate in the direction of desired material movement slowly so that there is little or no backward sliding of material being conveyed along the trough.

To achieve this forward motion of material with reciprocating action, there are a number of drive mechanisms which achieve this desired result. Typical of the prior art mechanisms which achieve this type of motion, are those which use rocking arms and pulling arms to achieve the desired reciprocatory motion. While this drive produces satisfactory motion, the operating elements are complicated and tend to be difficult to manufacture. The complicated elements also tend to be expensive to maintain and require substantial amount of floor space and volume which further increase costs. Additionally noise levels generated thereby tend to be excessive and undesirable.

As a further problem, the arms used to provide the reciprocating motion, have a tendency to get out of line which in turn affects the planar movement of the trough thereby putting undue stress on trough and the rest of the shaker conveyor, thereby reducing efficiency and causing further operational problems. It is extremely desirable to eliminate or reduce any vertical or lateral component of vibration of the conveyor trough. In this fashion, the energy is concentrated in the reciprocatory motion.

With the shaker conveyor drives of the prior art, such vertical or lateral components are inherent with wear on the arms, because loading of the trough causes stress and wear on the arms and arm attachments to the conventional drives and attachments for the drives. Such wear loosens the attachments and permits the lateral or vertical component of trough movement.

It is also desirable to adjust the speed of a shaker conveyor without doing major internal work on the drive mechanism. Use of arms renders such adjustments difficult.

It follows that use of arms to achieve the reciprocating movement of a shaker conveyor while necessary is inconvenient for many reasons. Therefore, it is desirable to eliminate the need for these arms in the shaker conveyor field while at the same time retaining the desirable functional aspects of the shaker conveyor.

It is well known in the prior art that the shaker conveyors and the drives used therefor are extremely effective for conveying heavy loads. However, this efficient means of conveying material is not economically justified for conveying light loads. Thus, there is a limitation on the use of these drives.

Even when drives are developed to convey light loads, it is usually necessary to have separate designs of drives for conveying lightweight and heavy duty loads. This duplication of designs and equipment is extremely expensive and adds greatly to manufacturing costs. If a shaker conveyor drive can be developed so that a shaker conveyor can be used with both lightweight and heavy loads with only minor adjustments in the trough and scaling the construction of the drive system correspondingly, it is extremely advantageous.

It is further desirable to develop a drive system for a shaker conveyor that is easily adjustable with regard to the length of the stroke. Drive systems known in the art include arm and yoke mechanisms which render the adjustment of the stroke extremely difficult. The difficulty is caused by balancing the adjustment of the fly wheel operations and the location of the yokes and arms to achieve the desired results. It thus follows that the arms are an extremely cumbersome part of the shaker conveyor of the prior art.

The advantages of simpler, more compact drive system for a shaker conveyor thus become clear.

SUMMARY OF THE INVENTION

Therefore, it is an object of this invention to provide a shaker conveyor capable of using a compact drive system.

A further object of this invention is to provide a drive mechanism for a shaker conveyor which reduces the noise in the area of an operating shaker conveyor.

A still further object of this invention is to provide a drive system for a shaker conveyor which avoids the use of reciprocating arms.

Yet a further object of this invention is to provide a drive system for a shaker conveyor which reduces arm load shock.

Another object of this invention is to provide a drive system for a shaker conveyor which permits simplified adjustment of the stroke of the shaker conveyor.

Yet another object of this invention is to provide a drive system for a shaker conveyor which eliminates the need for rocking arms.

Still another object of this invention is to provide a drive system for a shaker conveyor which eliminates the need for pulling arms.

Also an object of this invention is to provide a drive system for a shaker conveyor which minimizes adverse effects on the planar movement of the trough.

A further object of this invention is to provide a drive system for a shaker conveyor which minimizes a vertical component of vibration of the conveyor trough.

A still further object of this invention is to provide a drive system for a shaker conveyor which minimizes the lateral component of vibration for a shaker conveyor.

Yet a further object of this invention is to provide a shaker conveyor system having a simply adjusted speed.

Another object of this invention is to provide a shaker conveyor adaptable to light or heavy loads.

These and other objects of the invention are met by providing a drive system for a shaker conveyor connected to a power source using an eccentric secured to a fly wheel wherein the fly wheel drives a rotary plate in an eccentric fashion and results in the reciprocating motion of a shaker conveyor.

BRIEF DESCRIPTION OF THE DRAWING

FIG. I of the drawing depicts shaker conveyor system 10 comprising frame 20 and drive system 100.

FIG. II depicts a cross section of FIG. I along section line 2—2 and schematically shows the elements of reciprocating plate 130 and fly wheel 110.

Figure 1:
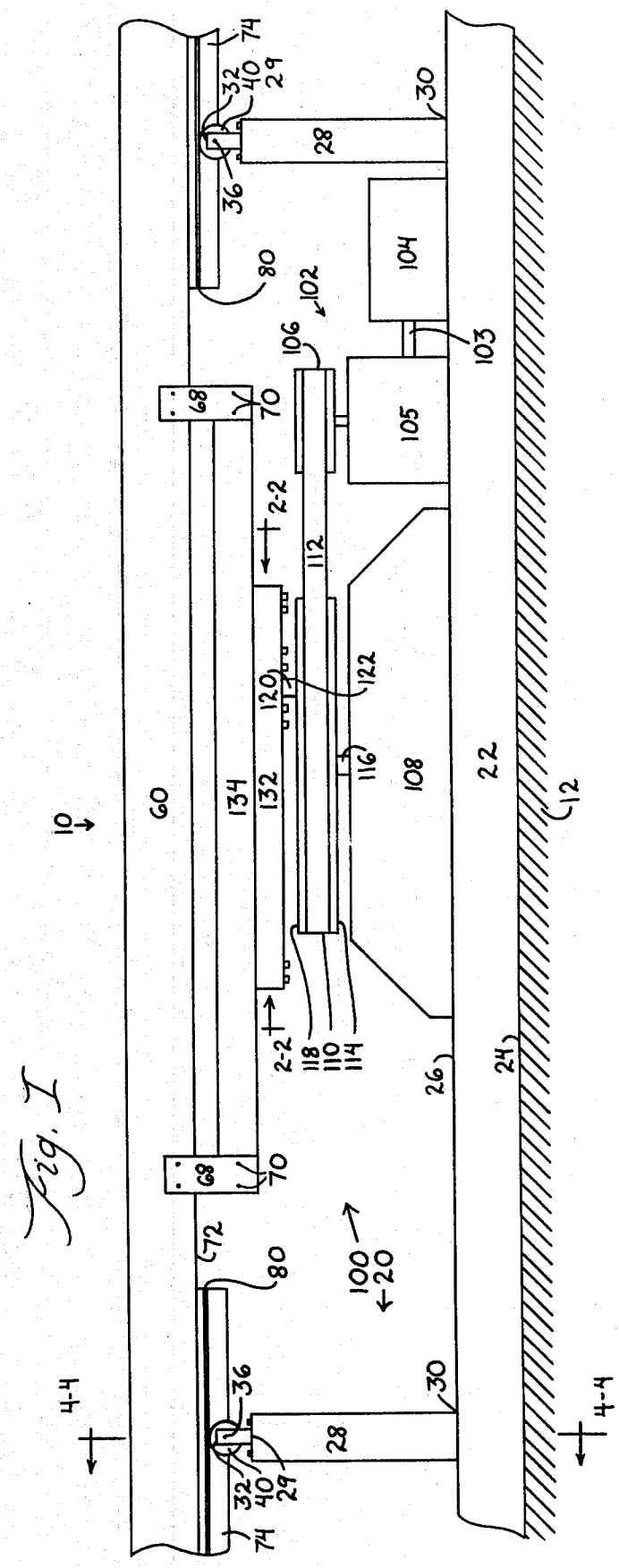

FIG. III is a top view of FIG. I having trough 60 removed therefrom with hidden parts of drive system 100 shown as dashed lines.

FIG. IV is a cross section of FIG. I along line 4—4.

FIG. V is a top view of drive system 100.

FIG. VI is a top view of drive system 100 with the trough 60 removed.

FIG. VII is a top view of drive system 100 with reciprocating plate 130 removed.

FIG. VIII is a horizontal cross-sectional view of reciprocating plate 130 showing eccentric bearing 126 and reciprocating plate bearing 132.

FIG. IX is a modification of eccentric 120 as mounted in FIGS. VI and VII.

FIG. X is an offset eccentric housing 200 for mounting eccentric 120 on fly wheel 110.

FIG. XI is a modification of eccentric bearing 126 mounting.

FIG. XII depicts adjusting means for eccentric bearing 126 or eccentric 120.

Throughout the specification and drawings which form a part of this specification, numerals referring to individual parts of the drive system 100 and the shaker conveyor 10 as shown in the figures of the drawing are the same throughout each of the figures of the drawing.

DESCRIPTION OF THE PREFERRED EMBODIMENTS

A shaker conveyor using rotary motion to develop the desired reciprocating motion of a shaker conveyor results in the use of a smaller drive system achieving the desired movement of the articles along the shaker conveyor.

GENERAL

Turning now to FIG. I and shaker conveyor 10 which is secured or situated on surface 12 in a standard fashion, the advantages of this invention become apparent. Surface 12 is a factory floor or mine floor, or other surface wherein a shaker conveyor can be used. Shaker conveyor 10 generally comprises a frame 20, a trough 60, and drive system 100.

FRAME

Frame 20 is the support basis for shaker conveyor system 10 and has frame base 22 contacting surface 12 at surface side 24 and frame base top side 26. On frame base top side 26 are mounted load rollers 40 for the purpose of supporting trough 60. Load roller support 28 is secured at a frame base end 30 to frame base top side 26. At the other and axis end 32 of load roller support 28 is a load roller mounting 29 for load roller axis 34 (as shown in FIG. IV). Load roller axis 34 is secured at axis support end 36 either fixedly or rotatably to load roller mounting 29; and at the other and roller end 38 to vertical load roller 40. Vertical load roller 40 must rotate. So load roller axis 34 either rotates or permits load roller 40 to rotate about the load roller axis 34. In this fashion load roller 40 supports the trough 60. In so supporting the trough 60, the load rollers combine with drive mechanism 100 to position and support trough 60 so that material may be conveyed along trough 60.

As shown in FIGS. I and IV, assisting load roller 40 in the support of trough 60 is horizontal guide roller 42. Guide roller 42 is supported by guide roller support 44 which is secured at guide frame base end 46 to load roller support 28 and has at the other and guide axis end 48 guide roller axis 50. Guide axis end 48 of guide roller support 44 is at a right angle with guide frame base 46. Guide roller axis 50 is secured at one end to guide roller support axis end 48 and at the other end to guide roller 42.

As many combinations of guide rollers and supports may be used as are necessary to support the trough 60. At least one guide roller 42 is used for each pair of load rollers 40. A person having ordinary skill in the shaker conveyor art can easily determine the number of load rollers 40 and guide rollers 42 required for effective operation. In a preferred embodiment, drive system 100 is centrally located under trough 60, with a pair of load rollers 40 and a guide roller 42 (as partially shown in FIG. I) under trough 60 and on both sides of drive system 100.

TROUGH

As shown in FIGS. I and IV, trough 60 includes a top trough side 62 for carrying the material customarily carried by a shaker conveyor such as shaker conveyor 10 of this invention. Trough 60 is generally horizontally disposed and includes a first side wall 64 parallel to the second side wall 66 above top trough side 62. Top trough side 62 is the load carrier part of shaker conveyor system 10. Within first side wall 64 and second side wall 66 are mounting apertures 68 for securing trough 60 to drive mechanism 100. A nut and bolt arrangement 70 secures trough 60 to drive mechanism 100.

Of course, trough 60 may be secured to drive mechanism 100 in any other suitable fashion. Trough 60 may be rubber cushion supported, welded thereto or otherwise attached.

Secured by welding or other suitable means to trough bottom 72 (trough bottom 72 being on the other side of top trough side 62) are angular roller contacts 74. Each roller contact 74 has a guide roller contact surface 76 and load roller contact surface 78. Due to guide roller 42 and load roller 40 being at right angles to each other, angular roller contacts 76 and 78 can contact both a guide roller and a load roller. Between guide roller 42 and load roller 40, and roller contact 74 can be wear surface 80 to avoid wearing of roller contact 74 and trough bottom 72. Wear surface 80 is easily replaced.

Other suitable guide roller and trough arrangements which may be used with the drive system 100 of this invention are disclosed in U.S. Pat. No. 4,019,625 to Haim J. Kamner, which is incorporated herein by reference.

DRIVE SYSTEM

FIGS. I, II, III, VI, VII, and VIII depict various parts and views of drive system 100.

Also secured to frame base 22 is drive system 100. Drive system 100 is powdered by a power source 102. Power source 102 includes an electric motor 104 connected in standard fashion to a reducer 105 by shaft 103. Reducer 105 is gearing system designed to adjust the power of electric motor 104 actually provided to drive fly wheel 110. Power source 102 is connected to drive system 100 through reducer 105 by means of a power source takeoff pulley 106 which is rotatably mounted in reducer 105 in standard fashion. Other power sources, such as hydraulic power sources are operable for the purposes herein too.

Drive system 100, including power source 102, and drive mechanism base 108 are secured to frame 20 in any standard fashion either fixedly or adjustably. Standard fixed means include welding. Gearing is a standard adjustable means.

Fly wheel 110 is connected to power source takeoff pulley 106 by means of power belt 112. With appropriate adjustments in the pulley 106 and fly wheel 110, more than one power belt may be used. Lower fly wheel base 114 is adjacent to frame 20. Fly wheel axle 116 has fly wheel 110 centrally and rotatably mounted thereon. Upper fly wheel face 118 is parallel to trough bottom 72, is opposite lower fly wheel base 114 and has secured thereto an eccentric 120. Eccentric 120 is secured at a fly wheel end 122 to upper fly wheel face 118 by welding, bolting, machining, or other suitable means.

At the other end of eccentric 120 is reciprocating plate end 124 having bearing ledge 125 (as shown in FIG. IX). Reciprocating plate end 124 of eccentric 120 is vertically secured and horizontally movable in eccentric bearing 126 when bearing 126 rests on bearing ledge 125 of eccentric 120 and is held in place by bearing cap 127 bolted or otherwise secured to eccentric 120. Bearing cap 127 is of sufficient size to so hold bearing 126 on eccentric 120. Eccentric bearing 126 is rotatably secured within reciprocating plate 130 by plate cap 131 bolted to reciprocating plate 130. Eccentric bearing 126 may also be secured in reciprocating plate 130 in another suitable fashion.

In FIG. VIII, reciprocating plate 130 is mounted within a reciprocating plate bearing 132, and is secured thereto by bolting arrangement 133 as shown in FIG. II or other arrangements. Bolting 133 also secures reciprocating plate 130 in a trough support 134 by means of trough support aperture 135 in trough support 134. Trough support 134 generally is flat and parallel to trough bottom 72. At corners 136 of trough support 134 are trough mounting brackets 138 welded or otherwise secured to trough support 134. Trough mounting brackets 138 include bracket apertures 140 (as shown in FIG. V) which correspond to trough apertures 68 through which bolts or other fastening means may be passed to secure trough 60 to trough support 134. It is clear that trough 60 may be secured to shaker conveyor 10 in other standard fashions. In this fashion, the structure of shaker conveyor 10 is set.

As shown in FIG. XI plate cap 131 includes a bearing holding ledge 144, which contacts eccentric bearing 126 and secures eccentric 120 and eccentric bearing 126 within eccentric aperture 128 in reciprocating plate 130. Bearing holding ledge 144 fits into eccentric receiver 145 within reciprocating plate 130. Eccentric receiver 145 is an aperture in reciprocating plate 130 and forms the female portion of a male-female relationship between eccentric 120 at reciprocating plate end 124. Plate cap 131 is held in place by plate cap bolts 146 threadably secured to reciprocating plate 130. Plate cap bolts 146 pass through plate cap apertures 148 into threaded relation with reciprocating plate 130, thereby securing eccentric 120 and eccentric bearing 126 within reciprocating plate 130. Other assemblies can also accomplish the function of plate cap 131. For example, reciprocating plate 130 may have eccentric bearing 126 machined therein.

Fly wheel 110 is rotatably secured on fly wheel axle 116 at one end of fly wheel axle 116 while the other end is secured in drive mechanism base 108. Thus, fly wheel 110 is supported rotatably. With fly wheel 110 secured rotatably on the fly wheel axis 116, the upper fly wheel 118 has secured thereto the eccentric 120. It is the rotation of fly wheel 110 in combination with the eccentric 120 communicating with the reciprocating plate 130 and eccentric bearing 126 which results in reciprocating plate 130 moving in an arc 137 (FIG. III), which in turn results in the reciprocating motion of trough 60 through stroke 135 (FIG. III), secured to trough support 134. Reciprocating motion of trough 60 is linear and parallel to fly wheel 110 and reciprocating plate 130. Fly wheel 110 revolving about fly wheel axle 116 transmits motion through eccentric 120, and thereby permits rotary motion to be converted directly into linear reciprocating motion due to reciprocating plate 130.

MODIFICATIONS

FIGS. IX, X, XI, and XII depict various modifications, which can be included in drive system 100 as an option. These modifications greatly simplify various desireable adjustments and greatly increase the utility of drive system 100.

FIG. IX depicts an oil seal system 150 situated substantially within fly wheel 110 as a modification of eccentric 120. Oil seal system 150 is designed to compensate for wear on guide roller contacts 76 and load roller contacts 78 suffered during the course of use by wear surface 80. As wear surface 80 is worn away, eccentric bearing 126 receives pressure due to the settling of the trough 60. With oil system 150, such pressure creates a compensation factor and substantially reduces or eliminates pressure on eccentric bearing 126.

Oil system 150 includes casing 151 as an outer shell of eccentric 120. Casing 151 is in a sealed, oil impermeable relationship with eccentric 120 and is situated within upper fly wheel surface 118.

Casing 151 is sealed by o-ring assembly 152. O-ring assembly 152 includes a plurality of o-rings. Bearing o-ring 154 is adjacent eccentric bearing 126. Fly wheel o-ring 156 is in a sealing relationship between casing 151 and fly wheel 110. Top o-ring 158 is between fly wheel o-ring 156 and bearing o-ring 154. Middle o-ring 160 is in a sealing relationship with casing 151 and between top o-ring 158 and fly wheel o-ring 156. Between top o-ring 158 and bearing o-ring 154 is top oil chamber 166.

Bottom oil chamber 164 is between flywheel 110 and eccentric 120. Oil channel 168 connects bottom oil channel 164 and top oil channel 166. Oil channel 168 is orificed by restrictor 170.

As wearing surface 80 is decreased in thickness, pressure increases on bottom oil chamber 164 and forces oil out of bottom oil chamber 164 through restrictor 170 into top oil chamber 166. Thus, oil is permitted to flow between top oil chamber 166 and bottom oil chamber 164 through oil channel 168. Such oil flow compensates for the pressure on eccentric bearing 126.

Restrictor 170 is sufficiently small so that substantially no oil flow may occur during normal operation. During a routine shutdown of drive system 100 oil flow may occur. Due to the substantially equal surface area of top oil chamber 166 and bottom oil chamber 164, vertical adjustment to compensate for wear of wearing surface 80 is facilitated. In this fashion, the vertical component of the movement of trough 60 is dampened. Also restrictor 170 is easily replaceable to adjust the desired oil flow.

As can be seen throughout the drawings, flywheel 110 is parallel to trough bottom 72 which is also parallel to reciprocating plate 130. This factor permits other functions and possible adjustments in drive system 100 can best be understood by reference to fly wheel axis 178 which is a vertical line passing through the center of fly wheel axle 116; trough centerline 180 situated between first parallel side 64 and second parallel side 66 and parallel thereto on trough top side 62; reciprocating axis 182 perpendicular to and passing through the center of reciprocating plate 130; and eccentric center axis 184 passing through the center of eccentric 120 and perpendicular thereto. These axes are geometric lines used to define positions.

If "x" distance 188 is the distance between the flywheel axis center 178 and the reciprocating axis 182; and "y" distance 190 is the distance between the trough centerline 180 and and fly wheel axis 178; then "w" distance 192 is hypotenuse of "x" distance 188 and "y" distance 190. It follows that "w" distance 192 is a component of the stroke intensity shaker conveyor system 10 imparted to trough 60. Thus "y" 190 distance may be changed by moving drive mechanism base 108 perpendicularly to trough centerline 180 and trough bottom 72. Such movement may occur in any standard fashion.

Variation in "v" distance 194 adjusts the stroke intensity of shaker conveyor system 10. The "v" distance 194 is the perpendicular distance between reciprocating axis 182 and eccentric center 184.

Stroke length 135 of conveyor system 10 is adjusted by varying "z" distance 186. This "z" distance 186 is between eccentric center 184 and flywheel axis 178. Approximately twice "z" distance 186 is the stroke length of shaker conveyor system 10. Variation in "z" distance 186 is achieved by adjusting the position of eccentric 120 in fly wheel 110. Such adjustment may occur in any suitable fashion.

With reference to FIG. X, one means of achieving variation in "z" distance is accomplished. FIG. X depicts a portion of flywheel 110 as modified to receive offset eccentric housing 200 within eccentric housing receiver 201. Eccentric housing receiver 201 is machined or otherwise formed in upper fly wheel surface 118. Into eccentric housing receiver 201 is secured offset eccentric housing 200. Eccentric housing bolt apertures 204 are equally spaced around the circumference of eccentric housing 200 and line up with upper flywheel bolt apertures 206. Eccentric housing bolts 208 pass through eccentric housing bolt apertures 204 into upper flywheel bolt apertures 206 to secure eccentric housing 200 to upper flywheel surface 118. Secured eccentrically by bolting or other standard means to eccentric housing top 210 of eccentric housing 200 is eccentric 120. In other words, fly wheel axis 178 and offset eccentric housing axis 202 are parallel to each other and not the same axis. Thus, if offset eccentric housing bolts 208 are removed and different pairs of eccentric housing bolt apertures 204 and and upper fly wheel bolt apertures 206 are formed, "z" distance 186 is varied.

As shown in FIGS. VI, XI and XII, in like fashion, eccentric reciprocating plate housing 220 duplicates the function of offset eccentric housing 200. Eccentric reciprocating plate axis 222 of eccentric reciprocating plate housing 220 is parallel to the eccentric center axis 184 and is not the same axis. Eccentric reciprocating plate housing receiver 221 is machined or otherwise formed in reciprocating plate 130 to receive eccentric reciprocating plate housing 220. Situated around the circumference of eccentric reciprocating plate housing 220 are plurality of equally spaced and radially equidistant reciprocating plate bolt apertures 224 which correspond with reciprocating bolt receiving apertures 226. Reciprocating bolts 228 pass therethrough and secure eccentric reciprocating plate housing 220 within reciprocating plate at reciprocating plate housing receiver 221. Reciprocating bolts 228 may be removed eccentric axis 184 may be adjusted with relation to reciprocating plate axis 182 and thereby adjust "v" distance 194.

CONCLUSION

With this conversion of rotary motion into reciprocating motion, desirable results are achieved. A more compact drive system is developed because the arms are not required. This compactness and simplification of parts to achieve the same results and improve the adjustability of the apparatus is a tremendous advantage in the art of shaker conveyors. Weight capacity of the shaker conveyor drive of this invention may be increased or decreased by appropriately adjusting the stress features of the drive and other conveyor components.

What is claimed and sought to be secured by Letters Patent of the United States is:

1. In a shaker conveyor system for conveying a variety of materials, comprising in combination, a frame means, a drive system supported on said frame means, and a linearly-reciprocating trough means supported on said frame means and connected to said drive system in a manner to affect reciprocating movement of said trough means, the improvement wherein said drive system comprises:
   a. a rotary power source;
   b. a transmitting means operatively connected to said power source for transmitting power from said power source to a converting means for converting rotary motion to reciprocating motion;
   c. said converting means operatively connected to a receiving means;
   d. said trough means being connected to said receiving means;
   e. said converting means comprises
      I. a fly wheel operatively connected to said power source by said transmitting means; and II. an eccentric secured to said fly wheel at an eccentric fly wheel end, said eccentric having a reciprocating plate end oppositely disposed from said fly wheel end;

f. said receiving means comprising
   I. a reciprocating plate rotatably receiving said reciprocating plate end of said eccentric; and
   II. said reciprocating plate being operatively connected to a trough support.

2. The shaker conveyor system of claim 1 further including:
   a. said fly wheel being rotatably mounted about a geometric fly wheel axis and being substantially parallel to a bottom of said trough means;
   b. said eccentric having a geometric eccentric axis offset from said fly wheel axis and parallel to said fly wheel axis.

3. The shaker conveyor system of claim 2 further comprising an adjusting means for changing a perpendicular distance between said geometric fly wheel axis and said geometric eccentric axis.

4. The shaker conveyor system of claim 3 wherein said adjusting means for changing said perpendicular distance between said geometric fly wheel axis and said geometric eccentric axis includes:
   a. said eccentric being secured to said fly wheel through an offset eccentric housing, said offset eccentric housing being secured within said fly wheel;
   b. said offset eccentric housing has a geometric eccentric axis offset from and parallel to said geometric fly wheel axis and said geometric eccentric axis;
   c. a perpendicular distance between said geometric fly wheel axis and said geometric eccentric housing axis being constant;
   d. a fixed position moving means for said eccentric housing for moving said eccentric housing to a plurality of fixed positions within said fly wheel so that a perpendicular distance between said geometric fly wheel axis and said geometric eccentric housing axis is constant, and a perpendicular distance between said geometric fly wheel axis and said geometric eccentric axis changes as said eccentric housing is secured in each position of said plurality of fixed positions.

5. The shaker conveyor system of claim 2 wherein:
   a. said reciprocating plate end is vertically secured and horizontally movable in said receiving means; and
   b. said reciprocating plate end of said eccentric being supported in an eccentric bearing within said reciprocating plate.

6. The shaker conveyor system of claim 5 wherein:
   a. said reciprocating plate includes an eccentric aperture for receiving said reciprocating plate end of said eccentric;
   b. said reciprocating plate end includes an eccentric bearing cap having a bearing ledge thereon for holding said eccentric bearing as a female portion of a male-female relationship therebetween; and
   c. said eccentric bearing cap being secured to said reciprocating plate end for holding said bearing on said reciprocating plate end.

7. The shaker conveyor system of claim 6 wherein:
   a. said eccentric bearing is held in said eccentric aperture of said reciprocating plate by a plate cap secured to said reciprocating plate at said eccentric aperture; and
   b. said plate cap vertically secures said eccentric bearing in said reciprocating plate while permitting movement about an eccentric bearing axis.

8. The shaker conveyor system of claim 7 wherein:
   a. said trough support for said trough means has said reciprocating plate secured therein;
   b. a reciprocating plate bearing secured in said trough support between said trough support and said reciprocating plate; and
   c. means for connecting said trough means to said trough support.

9. The shaker conveyor system of claim 8 wherein:
   a. said reciprocating plate bearing is secured vertically in said reciprocating plate and movable horizontally with said reciprocating plate; and
   b. said reciprocating plate, said reciprocating plate bearing, said trough support, and said fly wheel are parallel to said trough bottom.

10. The shaker conveyor system of claim 9 wherein:
    a. said eccentric bearing is secured to an offset eccentric bearing housing;
    b. a geometric eccentric bearing housing axis for said offset eccentric bearing housing, a geometric reciprocating plate axis parallel to said geometric eccentric bearing housing axis, and a geometric eccentric bearing axis parallel to said eccentric bearing housing axis;
    c. a perpendicular distance between said geometric eccentric bearing housing axis and said geometric reciprocating plate axis being constant; and
    d. an adjusting means for changing a perpendicular distance between said geometric reciprocating plate axis and said geometric eccentric bearing axis.

11. The shaker conveyor system of claim 10 wherein said offset eccentric bearing housing is movable to a plurality of fixed bearing positions within said reciprocating plate to thereby adjust a perpendicular distance between said geometric eccentric bearing axis while keeping a perpendicular distance between said geometric offset eccentric bearing housing axis and said geometric reciprocating plate axis constant.

12. The shaker conveyor system of claim 11 wherein said fixed bearing positions are determined by a plurality of equidistant, radially spaced eccentric bearing housing apertures in said offset eccentric bearing housing, said radially-spaced eccentric bearing housing apertures lining up with corresponding reciprocating plate apertures so that adjusting the pairing of one of said radially-spaced eccentric bearing housing apertures with one of corresponding reciprocating plate apertures, adjusts a perpendicular distance between said geometric reciprocating plate axis and said geometric eccentric bearing axis.

13. The shaker conveyor system of claim 12 further comprising an adjusting means for changing a perpendicular distance between said geometric fly wheel axis and said geometric eccentric axis.

14. The shaker conveyor system of claim 13 wherein said adjusting means for changing a perpendicular distance between said geometric eccentric axis and said geometric fly wheel axis includes:
    a. said eccentric being secured to said fly wheel through an offset eccentric housing;
    b. said offset eccentric housing having an eccentric housing axis offset from and parallel to said fly wheel axis and said eccentric axis;
    c. a perpendicular distance betwen said fly wheel axis and said eccentric housing axis being constant;

d. said eccentric housing being movable to a plurality of fixed positions on said fly wheel so that a perpendicular distance between said geometric fly wheel axis and said geometric eccentric housing axis is constant, and a perpendicular distance between said fly wheel axis and said geometric eccentric axis changes as said eccentric housing is secured in each position of said plurality of fixed positions.

15. The shaker conveyor system of claim 8 wherein said trough support further includes a trough support aperture for receiving said reciprocating plate.

16. The shaker conveyor system of claim 5 wherein:
 a. said eccentric fly wheel end of said eccentric includes an oil support means to absorb a load on said eccentric bearing;
 b. said oil support means includes a top oil chamber adjacent said eccentric bearing and a bottom oil chamber within said fly wheel; and
 c. a connecting means to allow oil to pass between said top oil chamber and said bottom oil chamber.

17. The shaker conveyor system of claim 16 wherein said connecting means comprises:
 a. a channel within said eccentric connecting said top chamber and said bottom chamber; and
 b. a restrictor within said channel to substantially eliminate the flow of oil between said top chamber and said bottom chamber while said shaker conveyor system is operating.

18. A shaker conveyor system comprising a frame means, a drive means secured to said frame means, and a trough means secured to said drive means and to said frame means, wherein:
 a. said frame means includes;
  I. a frame base;
  II. at least two load roller supports secured to said frame base;
  III. a pair of load roller mountings secured to said load roller support;
  IV. at least one guide roller support secured to each load roller support;
  V. a load roller secured to each of said load roller supports and contacting said trough means;
  VI. a guide roller secured to each of said guide roller supports and contacting said trough means;
  VII. a drive mechanism base secured to said frame means; and
 b. said trough means includes;
  I. a trough having a top trough side;
  II. a pair of trough sides perpendicular to and above said top trough side as a part of said trough; and
  III. a bottom trough side adjacent said drive means; and
 c. said drive means includes
  I. a power source;
  II. a fly wheel connected to said power source and rotatably mounted on a fly wheel axle;
  III. said fly wheel axle secured to said drive mechanism base;
  IV. an eccentric secured at a fly wheel end to said fly wheel so that an eccentric axis is parallel to a fly wheel axis;
  V. a reciprocating plate end of said eccentric opposite said fly wheel end of said eccentric secured and bearing supported in a reciprocating plate for rotation within said reciprocating plate;
  VI. said reciprocating plate being bearing supported within a support means for said trough means; and
  VII. said bottom of said trough side being parallel to said reciprocating plate.

19. The shaker conveyor system of claim 18 wherein:
 a. said reciprocating plate reciprocates within said support means and imparts reciprocating motion to said trough support means; and
 b. said drive system further includes an adjusting means for said reciprocating stroke.

20. The shaker conveyor system of claim 19 wherein said support means for said trough means includes:
 a. a trough support plate parallel to said trough;
 b. trough mounting brackets secured to said trough support plate;
 c. said trough support brackets having at a first end thereof a securing means for securing said trough support brackets to said trough support plate;
 d. said trough support brackets having at a second end thereof a trough mounting means for securing said trough to said brackets; and
 e. said trough being supported by at least four of said brackets; and said trough support plate having secured therein said reciprocating plate.

21. A shaker conveyor drive for use in affecting longitudinal reciprocating movement of a conveyor trough supported in a fixed guide way so as to be movable only longitudinally, said conveyor drive comprising, in combination, a fly wheel, means supporting said fly wheel for rotation about a first axis of rotation, an eccentric secured to said fly wheel on an upper fly wheel side, a reciprocating plate secured to said eccentric, said eccentric being eccentrically and rotatably mounted within said reciprocating plate and secured eccentrically thereto, and said shaker drive secured to a trough support for said conveyor trough, and said reciprocating plate rotatably and eccentrically mounted within said trough support.

22. The shaker conveyor drive system of claim 21 wherein the power source for the drive system is an electric motor connected to a reducer shaft.

23. The drive system of claim 22 wherein said electric motor and said reducer shaft operate said drive system by means of a belt drive connecting said reducer shaft to said fly wheel of said drive system.

24. The drive system of claim 23 further comprising an adjusting means for said eccentric for the purpose of adjusting the stroke of the shaker conveyor.

25. The drive system of claim 24 wherein the reducer output shaft includes a pulley connected by means of said belt drive to said fly wheel.

26. The drive system of claim 25 wherein said eccentric is bearing supported within said reciprocating plate.

27. The drive system of claim 26 wherein said reciprocating plate is bearing supported within said trough support.

28. The drive system of claim 27 wherein said trough support is bolted to said drive system.

29. The drive system of claim 28 wherein said reciprocating plate is secured thereto in bearing supported within said reciprocating plate.

30. The drive system of claim 21 wherein said eccentric is secured within said reciprocating plate in an oil supported and sealed system.

31. The drive system of claim 21 wherein said eccentric is bearing supported within said flywheel.

* * * * *